(12) United States Patent
Zheng et al.

(10) Patent No.: US 8,755,685 B2
(45) Date of Patent: Jun. 17, 2014

(54) JOINT SWITCHING METHOD FOR AN AGGREGATION NODE, AGGREGATION NODE AND SYSTEM

(75) Inventors: Ruobin Zheng, Shenzhen (CN); Chenghu Shen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 177 days.

(21) Appl. No.: 13/365,744

(22) Filed: Feb. 3, 2012

(65) Prior Publication Data

US 2012/0134664 A1 May 31, 2012

Related U.S. Application Data

(63) Continuation of application No. PCT/CN2010/071335, filed on Mar. 26, 2010.

(30) Foreign Application Priority Data

Aug. 27, 2009 (CN) .......................... 2009 1 0171252

(51) Int. Cl.
*H04B 10/00* (2013.01)
(52) U.S. Cl.
USPC .......... 398/2; 398/5; 398/16; 398/17; 398/25; 398/30; 398/33; 398/58; 398/63; 398/66
(58) Field of Classification Search
USPC .......................................... 398/1–38, 58–76
See application file for complete search history.

(56) References Cited

U.S. PATENT DOCUMENTS

| | | | | |
|---|---|---|---|---|
| 6,975,586 | B1* | 12/2005 | Yoshimura | 370/217 |
| 2002/0114028 | A1* | 8/2002 | Eijk et al. | 359/110 |
| 2007/0058973 | A1* | 3/2007 | Tanaka | 398/1 |
| 2007/0268818 | A1 | 11/2007 | Sugihara | |
| 2010/0247098 | A1* | 9/2010 | Nesset et al. | 398/58 |
| 2011/0013903 | A1* | 1/2011 | Rafel Porti et al. | 398/1 |

FOREIGN PATENT DOCUMENTS

| | | | | |
|---|---|---|---|---|
| CN | 1838548 | A | 9/2006 | |
| CN | 1866804 | A | 11/2006 | |
| CN | 1925371 | | * 3/2007 | ............... H04B 1/74 |
| CN | 1925371 | A | 3/2007 | |
| CN | 101466054 | | * 6/2009 | ............ H04Q 11/04 |
| CN | 101466054 | A | 6/2009 | |
| EP | 1 231 813 | A2 | 8/2002 | |

OTHER PUBLICATIONS

Office Action issued in corresponding Chinese Patent Application No. 200910171252.X, mailed Jan. 22, 2013.

(Continued)

*Primary Examiner* — Li Liu
(74) *Attorney, Agent, or Firm* — Brinks Gilson & Lione (57) ABSTRACT

A joint switching method for an aggregation node, an aggregation node, and an optical network protection system including an aggregation node are provided. By monitoring information transferred between an active optical line terminal (OLT) and a broadband network gateway (BNG), the aggregation node finds a fault in time according to the monitored information and when a fault occurs, the aggregation node starts a local protection solution, enables a corresponding backup port connected to a backup OLT corresponding to the active OLT, and disables an active port connected to the active OLT. Through the method, when the active OLT is switched to the backup OLT, the aggregation node performs joint switching, which ensures normal communication.

5 Claims, 5 Drawing Sheets

(56) References Cited

OTHER PUBLICATIONS

Written Opinion of the International Searching Authority issued in corresponding PCT Application No. PCT/CN2010/071335; mailed Jun. 17, 2010.
International Search Report issued in corresponding PCT Application No. PCT/CN2010/071335; mailed Jun. 17, 2010.
Supplementary European Search Report issued in corresponding European Patent Application No. 10 81 1132; mailed May 9, 2012.
Kang et al. "Restoration of Ethernet Services over a Dual-Homed GPON System—Operator Requirements and Practical Demonstration" NWD2.pdf—IEEE 2008.
"Layer 2 Control Mechanism for Broadband Multi-Service Architectures" Broadband Forum Technical Report. Dec. 2008.

* cited by examiner

JOINT SWITCHING METHOD FOR AN AGGREGATION NODE, AGGREGATION NODE AND SYSTEM

CROSS-REFERENCE TO RELATED APPLICATIONS

This application is a continuation of International Application No. PCT/CN2010/071335, filed on Mar. 26, 2010, which claims priority to Chinese Patent Application No. 200910171252.X, filed on Aug. 27, 2009, both of which are hereby incorporated by reference in their entireties.

TECHNICAL FIELD

The present disclosure relates to the field of communications technologies, and in particular, to a joint switching method for an aggregation node, an aggregation node, and an optical network protection system including an aggregation node.

BACKGROUND

A passive optical network (PON) technology is a point-to-multipoint (P2MP) optical access technology, and a PON system includes an optical line termination (OLT), an optical splitter (OS)/extender box (EB), optical network units (ONUs)/optical network terminals (ONTs), and optical fibers for connecting devices.

As an office end device, the OLT is connected to the OS/EB through a trunk optical fiber. The OS/EB is connected to each ONU through an individual branch optical fiber. The trunk optical fiber exists between the OS/EB and the OLT, and several branch optical fibers exist between the OS/EB and the ONUs. In a downlink direction (OLT→ONU), the OS/EB implements a light splitting function to send a downlink optical signal of the OLT to all the ONUs through the branch optical fibers. In an uplink direction (ONU→OLT), the OS/EB implements an optical signal aggregation function to aggregate optical signals sent by all the ONUs and send the aggregated optical signals to the OLT through the trunk optical fiber.

Figure 1:
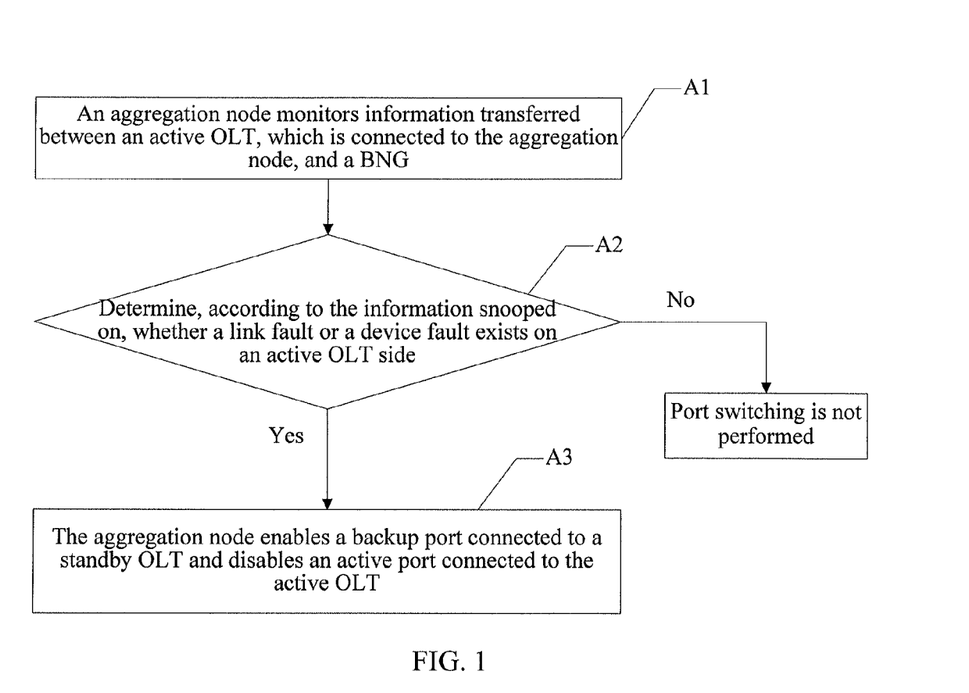
FIG. 1 is a flow chart of a joint switching method of an aggregation node according to Embodiment 1 of the present disclosure.

Currently, in order to eliminate a fault of the trunk optical fiber between the OS/EB and the OLT or an OLT fault, a 1+1 protection architecture as shown in FIG. 1 is generally adopted. The architecture adopts two sets of trunk optical fibers and OLTs, where one set of trunk optical fiber and OLT is active and the other set of trunk optical fiber and OLT is backup, to form 1+1 protection for the trunk optical fibers and the OLT. When the trunk optical fiber or the OLT is faulty, the backup OLT takes over the ONUs under the original active OLT. An aggregation node (AggN) or aggregation switch (AGS) is connected to the active OLT and the backup OLT through an active port and a backup port respectively. Alternatively, an active aggregation node and a backup aggregation node are connected to the active OLT and the backup OLT respectively. Similarly, an N:1 PON protection architecture may also be adopted, which will be discussed with reference to FIG. 3.

It is observed that, conventionally, when the active OLT or the trunk optical fiber between the active OLT and the OS (or EB) is faulty, a corresponding PON port of the active OLT is switched to the backup OLT, so the aggregation node cannot be notified that joint switching is required, and a link between the aggregation node and the active OLT cannot be jointly switched to a link between the aggregation node and the backup OLT, causing that the communication link cannot be restored to normal.

DETAILED DESCRIPTION

Embodiments of the present disclosure provide a joint switching method of an aggregation node, an aggregation node, and an optical network protection system, all for implementing active/backup switching of aggregation node ports. The aggregation node monitors information transferred between an active OLT, which is connected to the aggregation node, and a Broadband Network Gateway (BNG), and determines, according to the information monitored, whether a link fault or a device fault occurs on an active OLT side. When a link fault or a device fault occurs on the active OLT side, the aggregation node enables a backup port connected to a backup OLT and disables an active port connected to the active OLT.

In the embodiments of the present disclosure, by monitoring the information transferred between the active OLT and the BNG, the aggregation node may find a fault in time according to the information monitored, and when a fault occurs, the aggregation node starts a local protection solution, enables a corresponding backup port connected to the backup OLT corresponding to the active OLT, and disables the active port connected to the active OLT. When the active OLT is switched to the backup OLT, the aggregation node performs joint switching, which ensures normal communication.

Embodiment 1

A joint switching method of an aggregation node is exemplified in the flow chart of FIG. 1, which includes the following. At block A1, an aggregation node monitors information transferred between an active OLT, which is connected to the aggregation node, and a BNG. The aggregation node monitors multiple types of information transferred between the active OLT, which is connected to the aggregation node, and the BNG.

The aggregation node monitors PON port status information, which is periodically reported by the active OLT to the BNG through an access node control protocol (ANCP)/operation administration maintenance (OAM) message. Alternatively, the aggregation node monitors digital subscriber line (DSL) port status information periodically reported by the ONU to the BNG through an ANCP message or an OAM message, where the DSL port status information indicates that a trunk optical fiber between the ONU and the active OLT is normal. Alternatively, the aggregation node monitors a connectivity check message periodically transferred between the active OLT and the BNG. Alternatively, the aggregation node monitors a connectivity check message periodically transferred between the active OLT and a backup OLT. Specifically, the connectivity check message may be an OAM message or a bidirectional forwarding detection (BFD) message.

At block A2, the disclosed system determines, according to the information monitored, whether a link fault or a device fault occurs on an active OLT side. If a link fault or a device fault occurs on the active OLT side, continue to block A3; and, if no link fault or device fault occurs on the active OLT side, do not perform port switching.

In the embodiment of the present disclosure, according to the information monitored in block A1, it may be determined whether a link fault or a device fault occurs on the active OLT side in multiple ways. For example, when the aggregation node does not receive an ANCP message within a certain period of time, an OAM message or a connectivity check message is sent by the active OLT or the ONU, and the aggregation node determines that the active OLT or a link between the active OLT and the aggregation node is faulty. Alternatively, when the aggregation node receives an ANCP message/OAM message indicating that a corresponding PON port is faulty, the aggregation node determines that an active optical fiber link corresponding to the PON port or the PON port is faulty.

At block A3, the aggregation node enables a backup port connected to a backup OLT and disables an active port connected to the active OLT. Specifically, the aggregation node searches a local port backup list according to an identifier of the active port connected to the active OLT to acquire an identifier of the backup port corresponding to the identifier of the active port, enables the backup port according to the identifier of the backup port, and disables the active port according to the identifier of the active port.

In Embodiment 1 of the present disclosure, by monitoring on information transferred between the active OLT and the BNG, the aggregation node may find the fault in time according to the information monitored, and when a fault occurs, the aggregation node starts a local protection solution, enables a corresponding backup port connected to the backup OLT corresponding to the active OLT, and disables the active port connected to the active OLT. When the active OLT is switched to the backup OLT, the aggregation node performs joint switching, which ensures normal communication.

Embodiment 2

Figure 2:
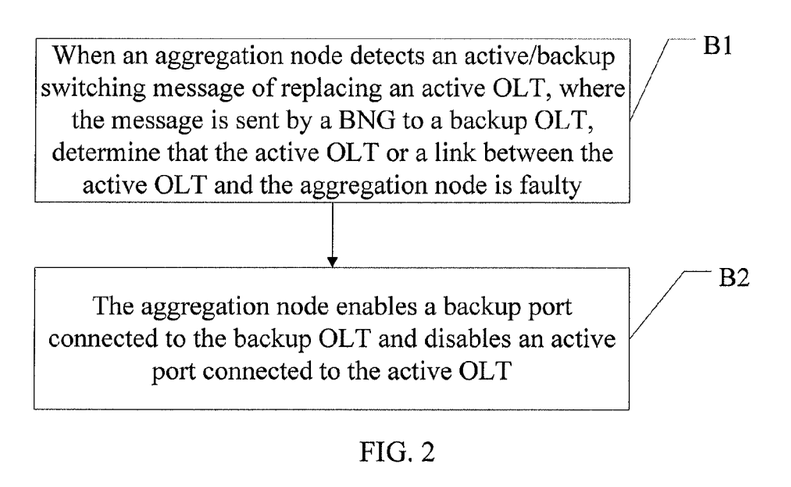
FIG. 2 is a flow chart of a joint switching method of an aggregation node according to Embodiment 2 of the present disclosure.

A joint switching method of an aggregation node is exemplified in the flow chart of FIG. 2, which includes the following. At block B1, when an aggregation node detects an active/backup switching message of replacing an active OLT and the message is sent by a BNG to a backup OLT, the aggregation node determines that the active OLT or a link between the active OLT and the aggregation node is faulty. In the embodiment of the present disclosure, the active/backup switching message may be implemented by using multiple types of conventional messages, for example, an ANCP message or an OAM message.

At block B2, the aggregation node enables a backup port connected to the backup OLT and disables an active port connected to the active OLT. Specifically, the aggregation node searches a local port backup list according to an identifier of the active port in the active/backup switching message to acquire an identifier of the backup port corresponding to the identifier of the active port, enables the backup port according to the identifier of the backup port, and disables the active port according to the identifier of the faulty port. After block B2, the method may further include forwarding the active/backup switching message to the backup OLT, so as to initiate switching of the backup OLT that is replacing the active OLT.

Figure 3A:
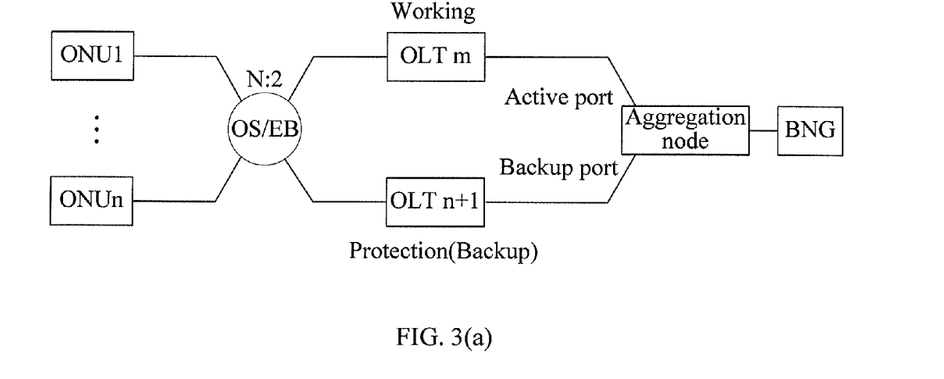
FIG. 3(a) is a schematic diagram of networking in a 1+1 mode applied by a method according to an embodiment of the present disclosure.
Figure 3B:
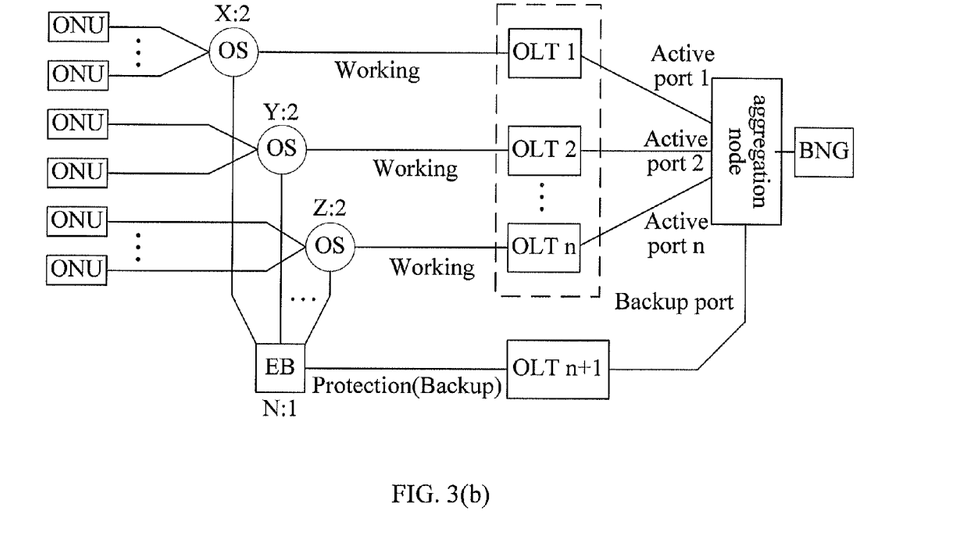
FIG. 3(b) is a schematic diagram of networking in an N+1 mode applied by a method according to an embodiment of the present disclosure.

FIG. 3 is a schematic diagram of a networking system applied by the method according to the embodiment of the present disclosure. FIG. 3(a) is a schematic diagram of networking in a 1+1 mode and FIG. 3(b) is a schematic diagram of networking in an N+1 mode.

In FIG. 3(a), multiple ONUs are connected to an active OLT (OLTm) through multiple OSs (or EBs) and then connected to an aggregation node. Each OS or EB is connected to a backup OLT (OLTn+1) through an enhanced EB and then connected to the aggregation node. The aggregation node is connected to a BNG to finally form a transmission channel from the BNG to the ONU. A port of the aggregation node may be a physical port or a logic port, for example, a virtual local area network (VLAN) port. A corresponding relation between an aggregation port and the OLT exists, and a corresponding relation between the aggregation port and a PON port of the OLT also exists.

In FIG. 3(b), n ONUs (ONU1, . . . , ONUn) are included. The n ONUs are connected to n active OLTs (OLTms) and a backup OLT (OLTn+1) through optical splitters or EBs. The n OLTms and the OLTn+1 are connected to the BNG through the aggregation node.

Based on the networking system applied by the present disclosure in FIG. 3, application examples where Embodiment 1 and Embodiment 2 of the present disclosure are applied to an actual communication scenario are provided in the following.

Figure 4:
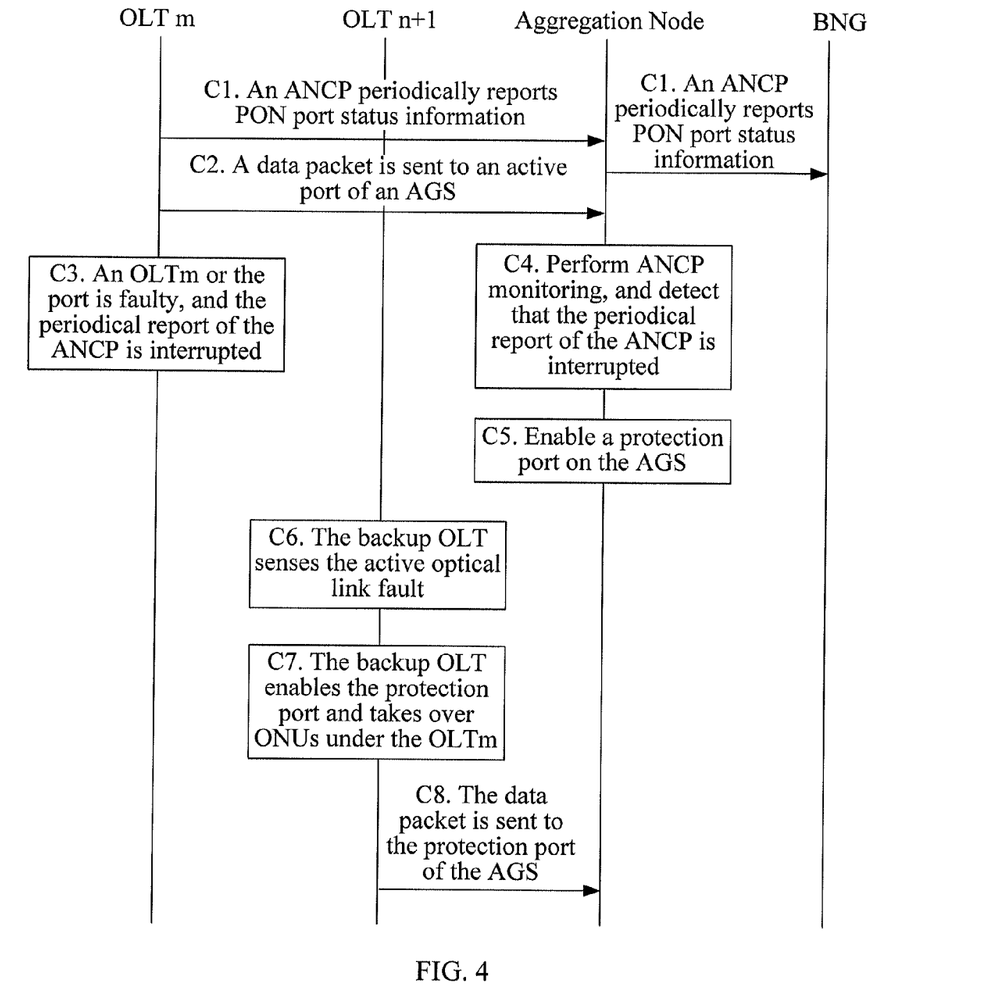
FIG. 4 is a flow chart of an application example according to Embodiment 1.

The flow chart in FIG. 4 shows an Example 1 according to Embodiment 1. If a backup OLT can determine whether to initiate switching between an active OLT and a backup OLT by monitoring an uplink optical signal, a device-level PON joint protection process is as shown in FIG. 3.

At step C1, when the active OLTm works normally, the active OLTm periodically reports PON port status information to a BNG through an ANCP message or an OAM message. Alternatively, an ONU periodically reports DSL port status information of the ONU to the BNG through an ANCP message or an OAM message, which indicates that the active OLTm/the mth path of trunk optical fiber is normal. Alternatively, a connectivity check message (for example, an OAM message or a BFD message) is periodically transferred between the active OLTm and the BNG. Alternatively, a connectivity check message (for example, an OAM message or a BFD message) is periodically transferred between the active OLT and the backup OLT. In practice, for the purpose of ensuring rapid switching within 50 ms, a period may be set to be 10 ms.

At step C2, an active port of an aggregation node works to receive a data packet from the active OLT or send a data packet to the active OLT. At step C3, when the active OLTm or a link between the active OLTm and the aggregation node is faulty, the active OLTm cannot report any PON port status information through an ANCP message or an OAM message. Alternatively, the ONU cannot report any DSL port status information through an ANCP message or an OAM message. Alternatively, the active OLTm cannot send a connectivity check message.

When an active optical fiber link or a PON port is faulty, the active OLTm reports corresponding PON port status information through an ANCP message or an OAM message according to a Loss of Signal (LOS)/Loss of Frame (LOF) alarm, so as to indicate that the corresponding PON port is faulty. Alternatively, all ONUs under the corresponding PON port cannot report any DSL port status information through an ANCP message. Alternatively, the active OLTm cannot send a connectivity check message corresponding to the PON port.

At step C4, the aggregation node performs monitoring on the ANCP/BFD/OAM message, and when the aggregation node finds that the aggregation node cannot receive an ANCP message or a connectivity check message sent by the active OLTm/ONU, the aggregation node determines that the active OLTm or a link between the active OLTm and the aggregation node is faulty. When the aggregation node finds that the aggregation node cannot receive an ANCP message, an OAM message, or a connectivity check message corresponding to a certain PON port sent by the active OLTm, or when the aggregation node receives an ANCP message or an OAM message corresponding to a certain PON port indicating that the corresponding PON port is faulty, the aggregation node determines that the active optical fiber link or the PON port is faulty.

At step C5, the aggregation node disables the original active port of the aggregation node and enables a corresponding backup port (or a protection port) of the aggregation node according to a fault type of the PON and a faulty port. The fault type may be an active OLTm fault, a link fault between the active OLTm and the aggregation node, or an active optical fiber link fault corresponding to a certain PON port of the active OLTm. For example, a backup VLAN port is searched for according to a faulty VLAN port in the ANCP message or the OAM message, and a downlink media access control (MAC) frame is forwarded to the backup port according to the VLAN. The corresponding backup port of the same aggregation node or another aggregation node may be enabled.

At step C6, the backup OLT can sense the active optical fiber link fault by monitoring the uplink optical signal. At step C7, when the active OLTm or the link between the active OLTm and the aggregation node is faulty, the backup OLT takes over all the ONUs under the active OLTm. When the active optical fiber link or the PON port is faulty, the backup OLT takes over the ONUs under the faulty port of the active OLTm. At step C8, a backup port of the aggregation node works to receive a data packet from the backup OLT or send a data packet to the backup OLT.

Figure 5:
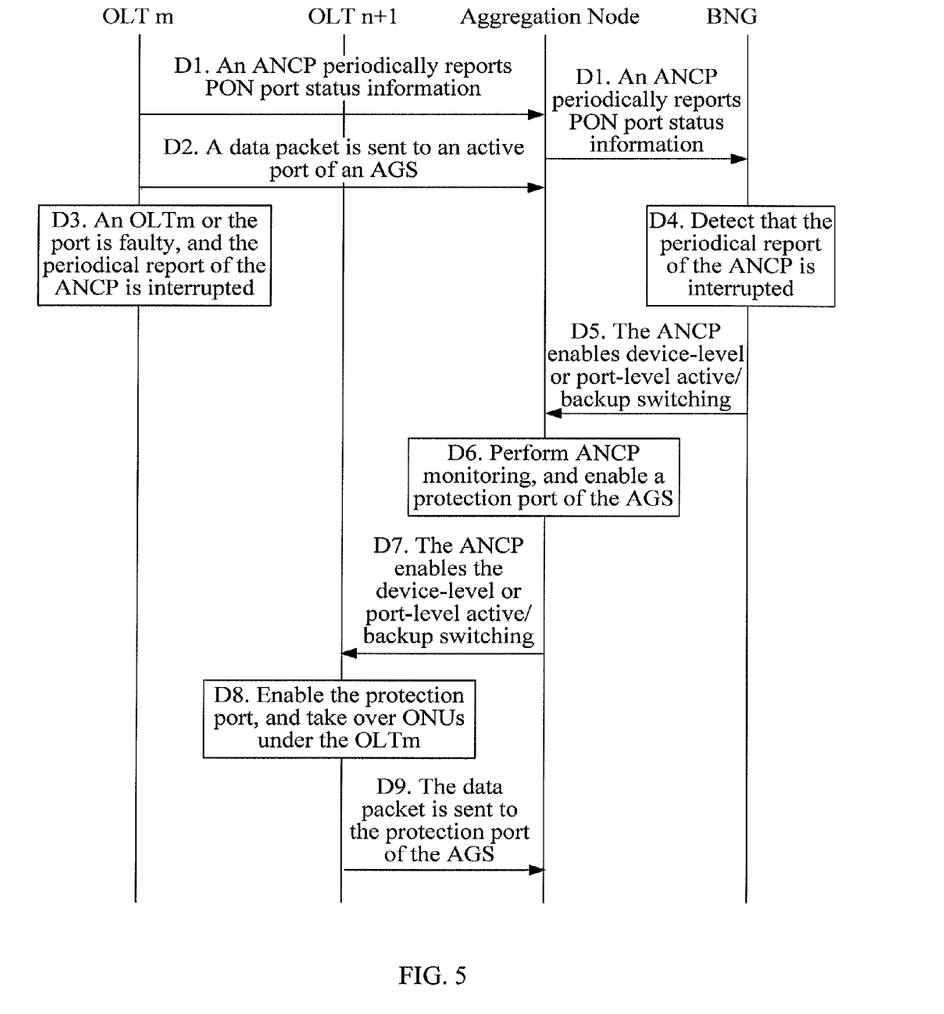
FIG. 5 is a flow chart of an application example according to Embodiment 2.

In a second embodiment (Embodiment 2), a BNG directly delivers an active/backup switching message, an aggregation node monitors the active/backup switching message, and then port switching is initiated. The flow chart of FIG. 5 shows an example according to Embodiment 2. Steps D1 to D3 are the same as steps C1 to C3 in FIG. 2.

At step D4, when the BNG finds that the BNG cannot receive an ANCP message, an OAM message, or a connectivity check message sent by the active OLTm/ONU, the BNG determines that the active OLT or a link between the active OLT and the BNG is faulty. When the BNG finds that the BNG cannot receive an ANCP message or a connectivity check message corresponding to a certain PON port and sent by the active OLTm, or when the BNG receives an ANCP message or an OAM message corresponding to a certain PON port and indicating that the corresponding PON port is faulty, the BNG determines that the active optical fiber link or the PON port is faulty.

At step D5, the BNG initiates active/backup switching of the OLT or active/backup switching of the PON port by delivering a switching command (for example, an ANCP message). At step D6, the aggregation node performs monitoring the ANCP message, disables the original active port of the aggregation node, and enables a corresponding backup port (or a protection port). For example, a VLAN ID (VID) of the backup port is searched for according to a VID of a faulty port in the ANCP message or the OAM message, and a downlink MAC frame is forwarded according to the VID of the backup port. At step D7. the aggregation node relays the ANCP message. At step D8, the backup OLT receives the switching command when the active OLTm or the link between the active OLTm and the aggregation node is faulty. The backup OLT then takes over all the ONUs under the active OLTm; and when the active optical fiber link or the PON port is faulty, the backup OLT enables the corresponding protection port to take over the ONUs under the faulty port of the active OLTm. Step D9 is the same as step C8 in FIG. 4.

Those of ordinary skill in the art can understand that all or part of the steps of the methods according to the embodiments of the present disclosure may be implemented by a program instructing relevant hardware. The program may be stored in a computer readable storage medium. The storage medium may include a Read Only Memory (ROM), a Random Access Memory (RAM), a magnetic disk, or an optical disk.

Apparatus embodiments based on the preceding method are provided in the following according to the embodiments of the present disclosure.

Embodiment 3

Figure 6:
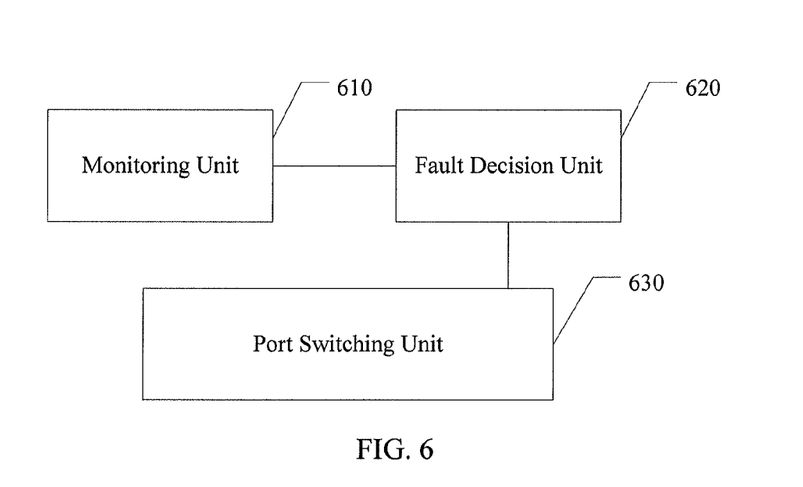
FIG. 6 is a schematic structural diagram of an aggregation node according to Embodiment 3.

The aggregation node shown in FIG. 6 includes a monitoring unit 610 configured to monitor information transferred between an active OLT, which is connected to the monitoring unit 610, and a BNG. The aggregation node may further include a fault decision unit 620, configured to determine, according to the information which is monitored by the monitoring unit, whether a link fault or a device fault occurs on an active OLT side. The aggregation node may further include a port switching unit 630, configured to enable a backup port connected to a backup OLT and disable an active port connected to the active OLT when a link fault or a device fault occurs on the active OLT side.

In the embodiment of the present disclosure, the monitoring unit 610 may be configured to monitor PON port status information periodically reported by the active OLT to the BNG through an ANCP message or an OAM message. The monitoring unit 610 may further be configured to monitor DSL port status information periodically reported by an ONU to the BNG through an ANCP message or an OAM message, where the DSL port status information indicates that the trunk optical fiber between the ONU and the active OLT is normal. The monitoring unit 610 may further be configured to monitor a connectivity check message periodically transferred between the active OLT and the BNG. The monitoring unit 610 may further be configured to monitor a connectivity check message periodically transferred between the active OLT and the backup OLT.

The fault decision unit 620 may be configured to determine that the active OLT or a link between the active OLT and the aggregation node is faulty when the monitoring unit 610 does not receive an ANCP message, an OAM message, or a connectivity check message sent by the active OLT or the ONU in a certain period of time. When the monitoring unit 610 monitors an ANCP message or an OAM message including PON port fault information, the monitoring unit may determine, according to the fault information, that an active optical fiber link corresponding to the PON port or the PON port is faulty. The monitoring unit 610 may determine that the active OLT or a link between the active OLT and the aggregation node is faulty when the monitoring unit monitors an active/backup switching message of replacing the active OLT and where the message is sent by the BNG to the backup OLT.

By monitoring the information transferred between the active OLT and the BNG the aggregation node provided by the embodiment of the present disclosure may find a fault in time according to the information monitored, and when a fault occurs, the aggregation node starts a local protection solution, enables the corresponding backup port connected to the backup OLT corresponding to the active OLT, and disables the active port connected to the active OLT. When the active OLT is switched to the backup OLT, the aggregation node performs joint switching, which ensures normal communication.

Embodiment 4

Figure 7:
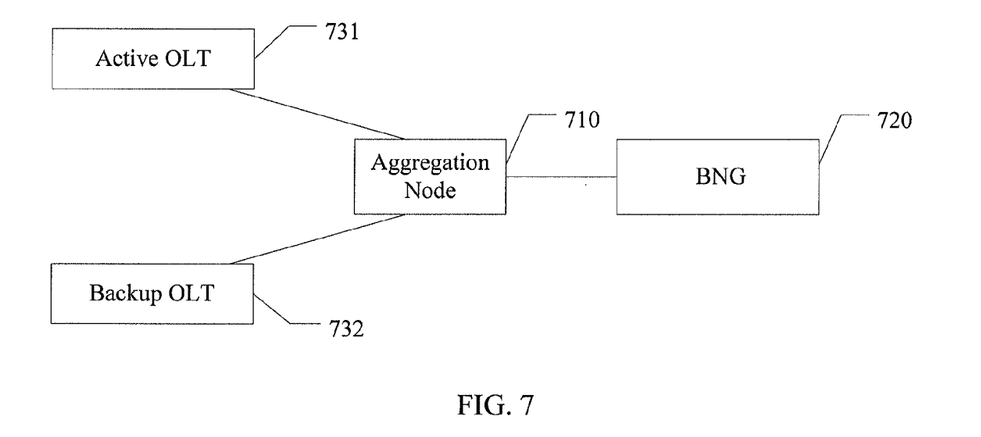
FIG. 7 is a schematic structural diagram of an optical network protection system according to Embodiment 4.

The optical network protection system shown in FIG. 7 includes an aggregation node 710, a BNG 720 connected to the aggregation node, at least one active OLT 731 and at least one backup OLT 732 connected to the aggregation node 710.

The aggregation node 710 monitors information transferred between the at least one active OLT 731, which is connected to the aggregation node 710, and the BNG 720, and determines according to the information monitored whether a link fault or a device fault occurs on an active OLT 731 side. Knowing whether a link fault or a device fault occurs on the active OLT side, the aggregation node enables a backup port connected to the OLT 732 and disables an active port connected to the active OLT 731.

For the method capable of being run by the aggregation node according to Embodiment 3 of the present disclosure and the optical network protection system according to Embodiment 4 of the present disclosure, reference may be made to the description in the preceding method embodiments.

The joint switching method of an aggregation node, the aggregation node, and the system provided by the embodiments of the present disclosure are introduced in detail above. The principle and implementation of the present disclosure are described herein through specific examples in this application. The description about the embodiments is merely used to facilitate understanding of the method and core ideas in the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

What is claimed is:

1. A joint switching method of an aggregation node, comprising:
monitoring, by an aggregation node, digital subscriber line (DSL) port status information transferred between an active optical line terminal (OLT) and a broadband network gateway (BNG), wherein the OLT is connected to the BNG through the aggregation node; and,
determining by the aggregation node, according to the DSL port status information, whether a link or a device fault occurs on an active OLT side,
wherein the DSL port status information is periodically reported by an optical network unit (ONU) to the BNG through an access node control protocol (ANCP) message or an operation administration maintenance (OAM) message; and
if a link fault or a device fault occurs on the active OLT side, enabling, by the aggregation node, a backup port of the aggregation node connected to a backup OLT, and disabling an active port of the aggregation node connected to the active OLT;
wherein the determining by the aggregation node according to the DSL port status information whether a link fault or a device fault occurs on the active OLT side comprises:
determining by the aggregation node that the active OLT or a link between the active OLT and the aggregation node is faulty if the aggregation node does not receive any DSL port status information from any ONU within a certain period of time.

2. The method according to claim 1, wherein the enabling, by the aggregation node, the backup port of the aggregation node connected to the backup OLT and disabling the active port of the aggregation node connected to the active OLT comprises:
searching, by the aggregation node, a local port backup list according to an identifier of the active port of the aggregation node connected to the active OLT to acquire an identifier of the backup port of the aggregation node corresponding to the identifier of the active port; and
enabling the backup port of the aggregation node according to the identifier of the backup port, and disabling the active port of the aggregation node according to the identifier of the active port.

3. The method according to claim 1, wherein the enabling, by the aggregation node, the backup port of the aggregation node connected to the backup OLT and disabling the active port of the aggregation node connected to the active OLT comprises:
searching, by the aggregation node, a local port backup list according to an identifier of the active port of the aggregation node connected to the active OLT to acquire an identifier of the backup port of the aggregation node corresponding to the identifier of the active port;
enabling the backup port of the aggregation node according to the identifier of the backup port; and
disabling the active port of the aggregation node according to the identifier of the active port.

4. An aggregation node, comprising:
a monitoring unit, configured to monitor digital subscriber line (DSL) port status information transferred between an active optical line terminal (OLT) and a broadband network gateway (BNG), wherein the OLT is connected to the BNG through the aggregation node;
a fault decision unit, configured to determine, according to the DSL port status information monitored by the monitoring unit, whether a link fault or a device fault occurs on an active OLT side,
wherein the DSL port status information is periodically reported by an optical network unit (ONU) to the BNG through an access node control protocol (ANCP) message or an operation administration maintenance (OAM) message; and
a port switching unit, configured to enable a backup port of the aggregation node connected to a backup OLT and disable an active port of the aggregation node connected to the active OLT if a link fault or a device fault occurs on the active OLT side;

wherein the fault decision unit is configured to:

determine that the active OLT or a link between the active OLT and the aggregation node is faulty if the monitoring unit does not receive any DSL port status information from any ONU within a certain period of time.

5. An optical network protection system, comprising:

an aggregation node;

a broadband network gateway (BNG);

at least one active optical line terminal (OLT) and at least one backup OLT;

the BNG being connected to the active OLT and the backup OLT through the aggregation node;

wherein the aggregation node comprises:

a monitoring unit, configured to monitor digital subscriber line (DSL) port status information transferred between the active OLT and the BNG;

a fault decision unit, configured to determine, according to the DSL port status information monitored by the monitoring unit, whether a link fault or a device fault occurs on an active OLT side, wherein the DSL port status information is periodically reported by an optical network unit (ONU) to the BNG through an access node control protocol (ANCP) message or an operation administration maintenance (OAM) message; and a port switching unit, configured to enable a backup port of the aggregation node connected to the backup OLT and disable an active port of the aggregation node connected to the active OLT if a link fault or a device fault occurs on the active OLT side;

wherein the fault decision unit is configured to:

determine that the active OLT or a link between the active OLT and the aggregation node is faulty if the monitoring unit does not receive any DSL port status information from any ONU within a certain period of time.

* * * * *